United States Patent
Stamper (10) Patent No.: US 8,020,519 B2
(45) Date of Patent: Sep. 20, 2011

(54) CHICKEN COOP DOOR MODULE

(75) Inventor: Thomas Perry Stamper, Holly, MI (US)

(73) Assignee: Thomas Perry Stamper, Holly, MI (US)

( * ) Notice: Subject to any disclaimer, the term of this patent is extended or adjusted under 35 U.S.C. 154(b) by 158 days.

(21) Appl. No.: 12/617,870

(22) Filed: Nov. 13, 2009

(65) Prior Publication Data

US 2011/0113692 A1    May 19, 2011

(51) Int. Cl.
*A01K 31/02*    (2006.01)

(52) U.S. Cl. .......................... 119/494; 119/484; 119/501

(58) Field of Classification Search .................. 119/494, 119/484, 495, 481, 501, 524; 49/333, 334, 49/339, 340, 169
See application file for complete search history.

(56) References Cited

U.S. PATENT DOCUMENTS

| | | | | |
|---|---|---|---|---|
| 3,284,950 | A * | 11/1966 | Gute | 49/28 |
| 3,675,370 | A * | 7/1972 | Catlett | 49/253 |
| 3,699,717 | A * | 10/1972 | Hedrick | 49/264 |
| 3,864,875 | A * | 2/1975 | Hewitt | 49/115 |
| 3,874,117 | A * | 4/1975 | Boehm | 49/264 |
| 5,072,544 | A | 12/1991 | Breck, Jr. | |
| 5,177,900 | A | 1/1993 | Solowiej | |
| 5,507,120 | A * | 4/1996 | Current | 49/340 |
| 5,581,940 | A | 12/1996 | Peterson | |
| 6,186,306 | B1 * | 2/2001 | Kamm | 193/31 A |
| 6,412,224 | B1 * | 7/2002 | Feucht et al. | 49/340 |
| 6,453,847 | B2 * | 9/2002 | Brooks | 119/484 |
| 6,553,717 | B2 * | 4/2003 | St. John et al. | 49/340 |
| 6,560,926 | B1 | 5/2003 | Gillett | |
| 6,691,463 | B1 * | 2/2004 | Richmond | 49/360 |
| 2003/0221631 | A1 | 12/2003 | Yarbrough | |
| 2005/0198901 | A1 | 9/2005 | Solowiej | |
| 2010/0116219 | A1 * | 5/2010 | Noyes | 119/484 |

OTHER PUBLICATIONS

Internet Web page http://www.buildeazy.com/photo-chicken-coop-beatarticle.html.

* cited by examiner

*Primary Examiner* — T. Nguyen (57) ABSTRACT

A chicken coop door module having a frame, a door, and a motor drive unit. The motor drive unit is configured to move the door toward the open position in response to receiving an opening signal so that the frame opening is unobstructed, move the door toward the closed position in response to receiving a closing signal so that the frame opening is obstructed, and prevent the door from moving when no signal is received. The door module receives an opening signal in the morning to let the chickens out of the chicken coop, and a closing signal in the evening to close the door to secure the chickens in the coop. When no signal is received, the door is prevented from moving by the motor drive unit so that when open, the chickens may freely enter and exit the coop; and when closed, predators cannot open the door and attack the chickens. The chicken coop door module may include a controller to provide the opening signal and the closing signal base on a signal from a timer or light detector.

20 Claims, 4 Drawing Sheets

CHICKEN COOP DOOR MODULE

TECHNICAL FIELD OF INVENTION

This invention generally relates to a chicken coop door module using a motor drive unit coupled to a pivot hinge to open a door in response to an opening signal, close the door in response to a closing signal, and prevent the door from moving when no signal is present.

BACKGROUND OF INVENTION

People are concerned about the quality and safety of chicken products consumed by their families. In particular, they are concerned about potential human health problems associated with consuming eggs and meat from chickens given growth hormones or other chemicals. As a result, some people are raising their own chickens so they have control over these concerns. It is believed that raising chickens as free range chickens produces chickens that are healthier, and so produce better eggs and meat. As used herein, free range chickens means chickens that are free to roam outside during the daytime. Free range chickens are usually raised in a rural environment, so there is a risk of nocturnal predators such as raccoon, fox, mink, weasel, and coyote attacking the chickens. Therefore, the chickens need a chicken coop with a door that is closed and secured each evening after the chickens instinctively return inside the chicken coop to roost. Raising free range chickens also requires that a chicken coop door be opened each morning. This daily opening and closing of a chicken coop door is an aspect of raising free range chickens that can be a problem for chicken ranchers if the rancher is working away from the chicken coop, or goes on vacation.

A guillotine like arrangement of a door panel guided in vertical tracks is known. Some arrangements have been automated to raise and lower the door panel by coupling the door panel to a motor using a cable or chain. The door is raised by retracting the cable, and is lowered by unwinding the cable and relying on gravity to lower the door panel. A drawback of a guillotine arrangement is that some predators, raccoon in particular, are adept at lifting the door panel to gain access to the chickens. To overcome this deficiency a locking mechanism has been suggested that adds cost and complexity to the automated chicken coop door. Furthermore, marketed examples of these doors show a relatively quick door movement, less than about 2 seconds. Such quick movement may startle and/or injure a chicken in the door opening when the door is closed. Another guillotine like arrangement has a lever coupled to a motor on one end, and a roller sliding in a slot coupled to the door panel on the other end. This arrangement is subject to the door becoming wedged in the tracks since the force to lift the door is not centered on the door panel. Both the cable and lever arrangements are subject to being prevented from completely closing by any material trapped under the door panel. Also, replacing the door panel of the lever arrangement is difficult because of the number of parts that need to be disassembled to replace the door panel.

Automated doors for humans to enter or exit a business are also known. Such doors use sensor mats or other proximity sensors to activate the doors. These doors also move relatively quickly to respond to an approaching customer and minimize the time that the door is open to reduce heating or cooling losses from inside the building. For safety reasons, in the event of a loss of power or other mechanical failure, the doors must be easily opened to allow customers to exit the store.

SUMMARY OF THE INVENTION

In accordance with the teachings of the present invention, a chicken coop door module includes a frame, a pivot hinge, a door, and a motor drive unit. The frame is configured to define a frame opening and to be attached to a chicken coop wall having a wall opening, wherein the frame opening is to be aligned with the wall opening. The frame includes a top frame portion, a bottom frame portion, a first side portion, and a second side portion. The pivot hinge is movably coupled to the frame and includes a rod configured to extend vertically between the top frame portion and the bottom frame portion substantially close to the first side portion and define a longitudinal axis. The arrangement is such that the pivot hinge pivots about the longitudinal axis. The door is coupled to the frame by the pivot hinge and is movable between an open position and a closed position. The open position is where the door is substantially vertical and substantially perpendicular to the frame such that the frame opening is substantially unobstructed. The closed position is where door is substantially vertical and substantially parallel to the frame such that the frame opening is substantially obstructed by the door. The motor drive unit is coupled to the pivot hinge. The motor drive unit is configured to rotate the pivot hinge about the longitudinal axis and thereby move the door toward the open position in response to receiving an opening signal, move the door toward the closed position in response to receiving a closing signal, and prevent the door from moving when no signal is received.

According to another aspect of the present invention, a chicken coop system includes a chicken coop, a frame, a pivot hinge, a door, and a motor drive unit. The chicken coop has a wall with a wall opening. The frame is attached to the wall and configured to define a frame opening that is aligned with the wall opening. The frame includes a top frame portion, a bottom frame portion, a first side portion, and a second side portion. The pivot hinge is movably coupled to the frame and includes a rod configured to extend vertically between the top frame portion and the bottom frame portion substantially close to the first side portion and define a longitudinal axis. The arrangement is such that the pivot hinge pivots about the longitudinal axis. The door is coupled to the frame by the pivot hinge and is movable between an open position and a closed position. The open position is where the door is substantially vertical and substantially perpendicular to the frame such that the frame opening is substantially unobstructed. The closed position is where door is substantially vertical and substantially parallel to the frame such that the frame opening is substantially obstructed by the door. The motor drive unit is coupled to the pivot hinge. The motor drive unit is configured to rotate the pivot hinge about the longitudinal axis and thereby move the door toward the open position in response to receiving an opening signal, move the door toward the closed position in response to receiving a closing signal, and prevent the door from moving when no signal is received.

According to another aspect of the present invention, a chicken coop door module includes a frame, a pivot hinge, a door, a motor drive unit, a controller, and a timer. The frame is configured to define a frame opening and to be attached to a chicken coop wall having a wall opening, wherein the frame opening is to be aligned with the wall opening. The frame includes a top frame portion, a bottom frame portion, a first side portion, and a second side portion. The pivot hinge is movably coupled to the frame and includes a rod configured to extend vertically between the top frame portion and the bottom frame portion substantially close to the first side portion and define a longitudinal axis. The arrangement is such that the pivot hinge pivots about the longitudinal axis. The door is coupled to the frame by the pivot hinge and is movable between an open position and a closed position. The open position is where the door is substantially vertical and substantially perpendicular to the frame such that the frame opening is substantially unobstructed. The closed position is where door is substantially vertical and substantially parallel to the frame such that the frame opening is substantially obstructed by the door. The motor drive unit is coupled to the pivot hinge. The motor drive unit is configured to rotate the pivot hinge about the longitudinal axis and thereby move the door toward the open position in response to receiving an opening signal and during an opening time to interval greater than about 15 seconds, move the door toward the closed position in response to receiving a closing signal and during a closing time interval greater than about 15 seconds, and prevent the pilot hinge from rotating when no signal is received and thereby prevent the door from moving when no signal is received. The controller is electrically connected to the motor drive unit and configured to output the opening signal at an opening time and output the closing signal at a closing time. The timer is coupled to the controller and configured to output a timer signal to determining the opening time for outputting the opening signal and determine the closing time for outputting the closing signal.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
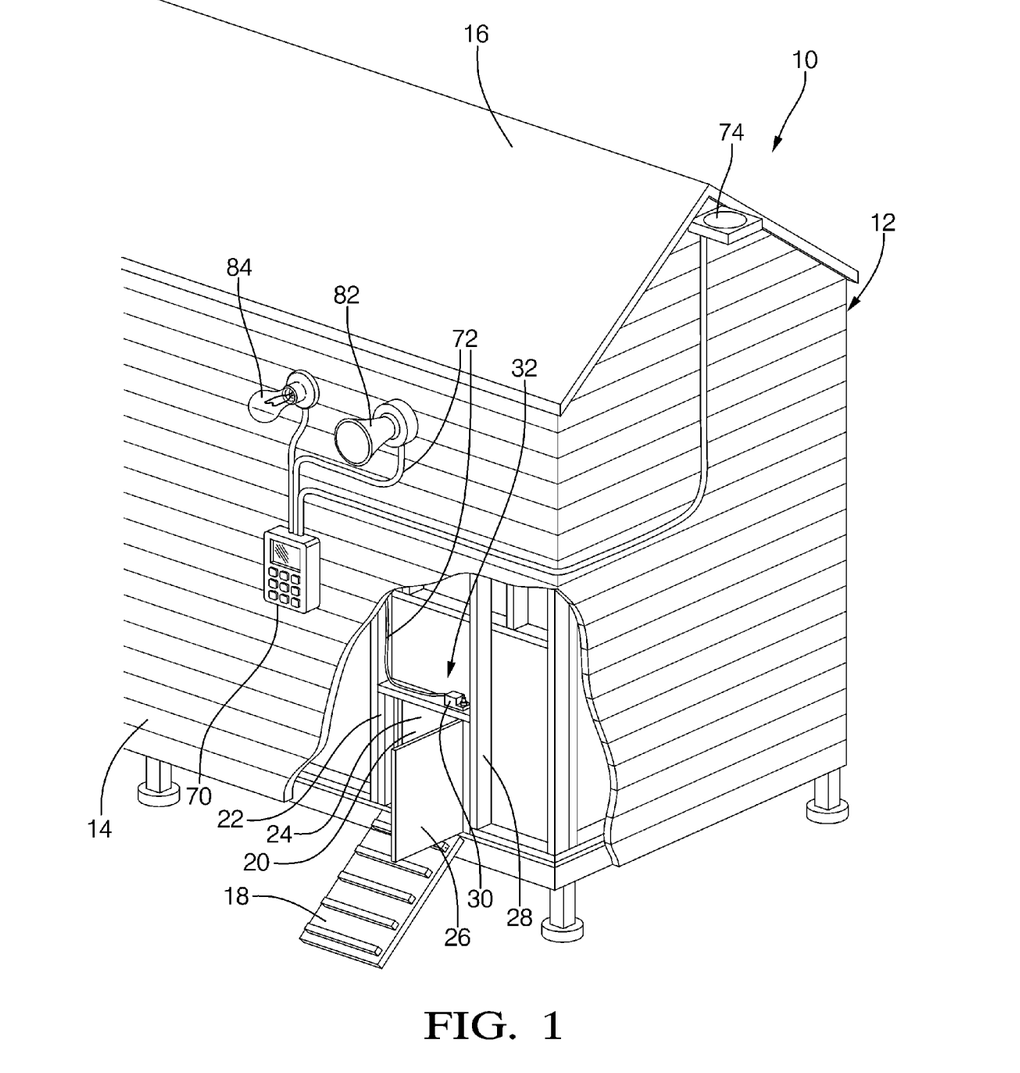
FIG. 1 is a sectional perspective view of a chicken coop system having a chicken coop door module.

In accordance with a preferred embodiment of this invention, referring to FIG. 1, a chicken coop system 10 includes a chicken coop 12 having doorway suitably sized for a chicken to pass through. Suitably sized means no larger than necessary for a chicken to readily pass through. The doorway is automated so the doorway can be opened each morning to let the chickens out of their roosting area without a caretaker going to the chicken coop 12 to manually open the door. As nighttime approaches, chickens will instinctively return to their roosting area. The automated doorway can then be closed without a caretaker going to the chicken coop 12 to manually close the door. The motorized doorway is further configured to remain in the closed position to prevent predators from opening the door and attacking the chickens.

The chicken coop 12 includes a wall 14 and a roof 16. The chicken coop 12 provides suitable shelter to protect chickens from inclement weather and predators, and provides a place for the chickens to lay eggs. The chicken coop 12 may be a standalone structure, or be a portion of a larger building such as a barn or garage. The wall 14 has a wall opening 20 suitably sized for a chicken to pass through. For ease of illustration purposes, the wall siding material around the wall opening 20 has been omitted to better illustrate other features of the chicken coop system 10. As such, the outline of wall opening 20 through the siding material is not specifically shown in FIG. 1, and is understood to coincide with the doorway opening. Some chicken coop doorways are elevated to help keep the interior of the chicken coop 12 dry, so the chicken coop system 10 may include a ramp 18 to make it easy for chickens to enter and exit the chicken coop 12.

The chicken coop system 10 has a frame 22 configured to define a frame opening 24 that coincides with the wall opening 20. The wall opening 20 and frame 22 are preferably rectangle because rectangles are simple to construct. Alternately, for aesthetic reasons, the wall opening and frame opening may be round, oval, or some irregular shape. The frame 22 is attached to the wall 14 such that the frame opening 24 aligns with the wall opening 20. As illustrated, the wall 14 is a stud type wall. A stud 28 is suitably arranged to support the roof 16, and provide structural strength for the wall 14.

A chicken coop constructed according to common building practices for wood has the studs made from two-by-four's. For such a building, the frame 22 is suitably made from wood boards having a cross section dimension of 3.5 inch by 1.5 inch; commonly called two-by-four's. Wood is economical and easy to machine using readily available tools. A chicken coop may also be made of metal and as such the frame 22 may be advantageously made from metal or polymer. A frame 22 made of metal such as aluminum or a polymer may be preferable if the frame is to be subject to repeated cleaning such as with a power washer that sprays liquids at high pressure. For wood based construction, the frame 22 may be attached to the wall 14 by using screws or nails to fasten the frame 22 to the stud 28. If the chicken coop does not have the stud 28, then the frame 22 may be attached to whatever material was used to construct the wall 14 using a number of known attachment methods.

The frame 22, and other components such as a door 26 and a motor 30 may be assembled piece-wise when the wall 14 is built. Preferably, the frame 22, the door 26, the motor 30, and other parts necessary for a motorized doorway may be pre-assembled to form a chicken coop door module 32 that is installed into the wall 14 after all or part of the wall 14 is constructed, or as a modification to an existing building.

Figure 2:
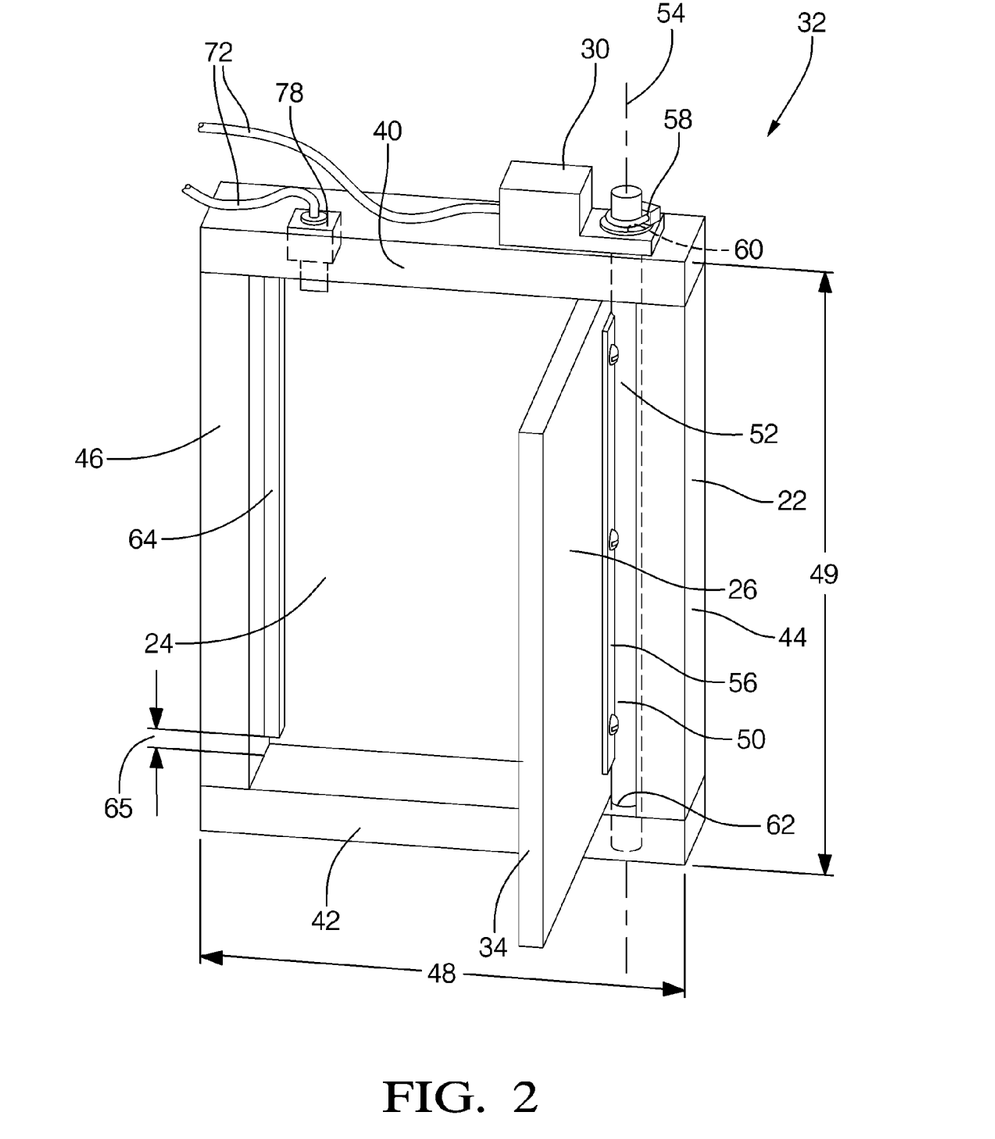
FIG. 2 is a perspective view of a chicken coop door module illustrated in FIG. 1 depicting the door in the open position.
Figure 3:
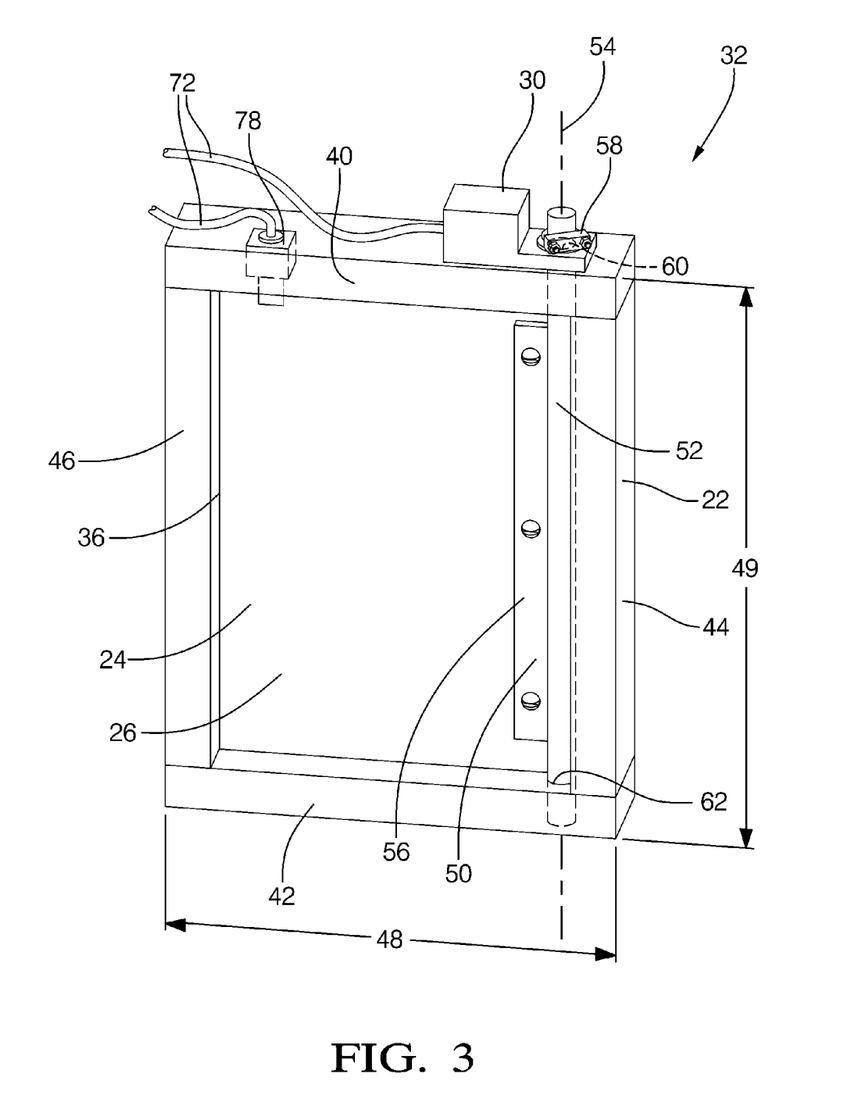
FIG. 3 is a perspective view of the chicken coop door module illustrated in FIG. 1 depicting the door in the closed position.

FIGS. 2 and 3 further illustrate the chicken coop door module 32. FIG. 2 depicts the door 26 in an open position and FIG. 3 depicts the door 26 in a closed position. The door 26 is coupled to the frame 22 using a pivot hinge 50 arranged in such a way as to be movable between the open position, where the frame opening is substantially unobstructed, and a closed position, where the frame opening 24 is substantially obstructed by the door 26. As used herein, substantially unobstructed means that the door 26 is in such a position as to allow a chicken to readily pass through the frame opening 24. As used herein, substantially obstructing the frame opening means blocking off the frame opening 24 sufficiently to prevent predators from entering the chicken coop when the door is in the closed position.

The door 26 defines a door edge 34. When the door 26 is in the closed position, it is advantageous if the door edge 34 is recessed within the frame opening 24, as opposed to being on the face of the frame opening, because a recessed configuration makes it more difficult for a predator to get a grip on the door edge 34 and pull the door 26 open. It is preferable that the door edge 34 is spaced apart from the inside surface of the framing opening 24 by a frame to door clearance gap 36 less than 1.6 millimeter (1/16 inch). Having the clearance gap less than 1/16 inch frustrates predators such as raccoons from getting their fingers or claws into the door clearance gap 36 and thereby getting a grip on the door edge. Having a small clearance gap also minimizes inclement weather intrusion into the chicken coop 12.

It may also be desirable for the door 26 to seal off the opening such that wind and rain do not enter the chicken coop. The door 26 may also provide an insulating barrier for keeping warm air within the chicken coop when the outside air is cold. The door 26 is suitably made of plywood. A moisture resistant grade of ⅜ inch plywood provides suitable strength and durability, while also being economical. The door may also be covered with a layer of material such as paint or vinyl siding (not shown) so the door's appearance is attractively coordinated with the appearance of the chicken coop 12. If the door is to be subject to repeated power washing, it may be preferable to form the door 26 from metal or polymer. The door module 32 may also have weather seals (not shown) either attached to the door 26 or the frame 22 to improve sealing therebetween.

A chicken coop constructed in accordance with common practices has two-by-four studs spaced apart 16 inches on-center so that the space between adjacent studs is about 368 millimeters (14.5 inches). As such, the chicken coop door module 32 may suitably have a frame 22 that defines a rectangle perimeter having a perimeter width 48 of about 368 millimeters (14.5 inches), and a perimeter height 49 greater than about 368 millimeters (14.5 inches). If the frame 22 is constructed of two-by-fours, then the top frame portion 40, the bottom frame portion 42, the first side portion 44, and the second frame portion 46 may each have a frame portion width of about 38 millimeters (1.5 inches), corresponding with the minor cross section dimension of a two-by-four. Also as a result of using two-by-fours in this orientation, the frame opening has a horizontal opening width of about 292 millimeters (11.5 inches) and a vertical opening height greater than about 292 millimeters (11.5 inches). Preferably, the frame 22 is constructed of two-by-fours to have a perimeter height of about 483 millimeters (19 inches) which provides a vertical opening height of about 406 millimeters (16 inches). Also, such a frame has a frame thickness of about 89 millimeters (3.5 inches), consistent with the major cross section dimension of a two-by-four.

The frame opening 24 is a rectangle defined by a top frame portion 40, a bottom frame portion 42, a first side portion 44, and a second side portion 46. A pivot hinge 50 is adapted to movably couple the door 26 to the frame 22. The pivot hinge 50 includes a rod 52 configured to extend vertically between the top frame portion 40 and the bottom frame portion 42 substantially close to the first side portion 44. The vertical orientation of the rod 52 defines a longitudinal axis 54 and the pivot hinge 50 pivots or rotates about the longitudinal axis 54. Substantially close means that the rod 52 is as close as possible to the first frame portion 44 so the width of the doorway is maximized, but the rod 52 is not rubbing on the first side portion 44. When the door is in the open position, the door 26 is substantially vertical and substantially perpendicular to a plane collinear with the longitudinal axis and parallel to the frame 22. When the door 26 is in the closed position, the door 26 is substantially vertical and substantially parallel to the frame 22. As used herein, substantially vertical, substantially perpendicular, and substantially parallel are common descriptive terms corresponding to what can be ascertained by simple observation, and do not imply any particular degree of accuracy or precision. Alternately, the door 26 and pivot hinge 50 could be oriented horizontally such that the door 20 acts like an awning over the doorway when open, or is part of the ramp 18 when open. However, by having the door 26 and pivot hinge 50 oriented vertically, the motor drive unit 30 is not mechanically loaded or stressed when the door is in the open position. Undesirable mechanical loading would be the case with a horizontal orientation to either support the weight of the door and or a chicken walking on the door. The arrangement of the frame 22, the pivot hinge 50 and the door 26 is also advantageous in that as the door moves toward the closed position, the door 26 sweeps the bottom frame portion 42 clear of any debris that could otherwise inhibit the door 26 from completely closing.

The pivot hinge 50 further comprises a plate 56 arranged tangential and fixedly attached to the rod 52. The rod 52 and the plate 56 are preferably made of metal and welded together. The configuration of the plate 52 provides a convenient way to fasten the door 26 to the pivot hinge 50 and simplifies replacing the door 26 if desired. The door 26 is preferably fastened to the plate 56 using screws. Three round head screws are shown in FIGS. 2 and 3. Pan head, hex head, or Allen head screws would also be suitable. The screw may be threaded into T-nuts (not shown) pressed into holes in door 26, or secured using any of a variety of nuts such as hex nuts or locking nuts. Alternately, the door 26 could be coupled to the rod 52 using U-clamps passing around the rod 52 and through the door 26, and secured using nuts on the side of the door 26 opposite the rod 52. Alternately, the holes in plate 52 could be threaded, and the screw heads would be on the other side of the door 26.

The motor drive unit 30 is preferably attached to the top frame portion 40 on the perimeter side of the frame as illustrated in FIG. 2-3. Such an arrangement avoids interference of the motor drive unit 30 with the installation of the chicken coop door module 32 into a stud type wall. Arranging the motor drive unit 30 to be above the door, thereby above the travel path of the chickens, helps avoid or at least reduce dirt and water contamination of the motor drive unit 30. The motor drive unit 30 has a motor output coupled to the pivot hinge 50 and adapted to rotate the pivot hinge 50. The motor output turns a rotating coupler 58 arranged to rotate about the longitudinal axis. The rod 52 extends through the rotating coupler 58. The rod 52 is fixedly attached to the rotating coupler 58, preferably by a clamp. The rod 52 extends above the top frame portion 40 by an amount sufficient for clamping to the rotating coupler 58, suitably about 51 millimeters (2 inches).

The bottom end of the rod 52 extends into a bottom hole 62 in the bottom frame portion 42. The rotating coupler 58 secures the rod 52 vertically, so there is no need to vertically support the bottom end of the rod 52. The bottom hole 62 is preferably a through-hole so material entering the top of bottom hole 62 may fall through the bottom hole 62 and not accumulate and possibly interfere with rotation of the rod 52. The bottom hole 62 has a diameter large enough to prevent the rod 52 from binding with the bottom hole 62 when rotating to open or close the door if small pieces of debris such as sand fall into the bottom hole 62. A suitable diameter for the bottom hole 62 is about 1.6 millimeter (¹⁄₁₆ inch) larger than the diameter of the rod 52. A suitable rod diameter is 12.7 millimeter (½ inch). For such a rod diameter, a suitable bottom hole diameter is 14.3 millimeter (⁹⁄₁₆ inch). A bottom hole diameter much larger is undesirable as the door 26 may rattle when in the open position.

The rod 52 also extends through a top hole 60 in the top frame portion 40. The top hole 60 has a diameter large enough to prevent the rod 52 from binding with the top hole 60 when rotating to open or close the door. Preferably, the top hole 60 is also configured so that if a) the screws attaching the door 26 to the pivot hinge 50 are removed, b) the door 26 is removed, c) the clamp securing the pivot hinge 50 to the rotating coupler 58 is loosened, and d) the distance between the top edge of the plate 56 and the top frame portion 40 is sufficient, then the pivot hinge 50 may be lifted out of bottom hole 62 and angled to moved the bottom end of pivot hinge 50 outside of the frame opening 24 such that the pivot hinge 50 can be withdrawn out of the top hole 60 and thereby removed from the frame 22 without disassembling the frame 22. It is advantageous to be able to remove pivot hinge 50 without disassembling frame 22 since once chicken coop door module 32 is attached to a chicken coop wall 14, it may be difficult to disassemble frame 22. The top hole 60 is configured to cooperate with the removing of pivot hinge 50 by having a frustoconical shape or by being sufficiently large. Optionally the center of top hole 60 may be offset from the longitudinal axis. The plate 52 is depicted shorter than the height of the frame opening 24 so that the pivot hinge 50 can be lifted out of the hole 62 as described above. These features simplify maintenance such as painting pivot hinge 50 or cleaning bottom hole 62.

The motor drive unit 30 is configured to move the door toward the open position in response to receiving an opening signal, and move the door toward the closed position in response to receiving a closing signal. The opening signal and closing signal may be a low voltage or signal level type signal commonly used for digital electronics, or the signals may be voltages that also provide electrical power to the motor drive unit 30. The opening signal and the closing signal are preferably output by a controller 70. Such a controller would automate the chicken coop door module, thereby relieving the chicken caretaker from having to be present every time the chicken coop door needs to be opened or closed. Alternately, the opening signal and the closing signal may be manually generated by the chicken caretaker operating a control switch coupled to the motor control unit 30. Such a manually operated switch may be located near the chicken coop 12, or some distance away, in the caretaker's home for example.

When no signal is received, the motor drive unit 30 is configured to hold the door 26 at its present position and thereby prevent the door 26 from moving. This feature is advantageous when the door is closed to prevent predators from opening the door. Also, the door remains in the open position after the opening signal is terminated, even if a wind or a chicken applies force to the door. Using a motor drive unit 30 capable of preventing the door 26 from moving when the door is in the closed position alleviates the need to include a separate locking mechanism to keep the door 26 in the closed position and prevent predator attacks.

A suitable motor drive unit 30 is a Belimo damper actuator, model LM24-3. The LM24-3 has a rotating coupler 58 adapted to clamp the rod 52. The diameter of the rod 52 is selected to correspond to the rotating coupler, 12 mm (0.5 inch) being suitable for the LM24-3. The motor drive unit 30 is arranged to align the rotational axis of the rotating coupler with the longitudinal axis 54. The motor drive unit 30 receives the opening signal and the closing signal through a wire 72. The Belimo LM24-3 moves the door 26 in the opening direction while the opening signal is being received, or in the closing direction while the closing signal is being received. The opening signal and closing signal provide a voltage effective to energize the motor drive unit 30. The LM24-3 is configured such that the opening signal and closing signal must persist for a period of time sufficient to move the door 26 to the closed position or the open position.

The motor drive unit is preferably configured move the door 26 about 90 degrees from the closed position to the open position during an opening time to interval greater than about 15 seconds, and move the door 26 about 90 degrees from the open position to the closed position during a closing time interval greater than about 15 seconds. By allowing at least 15 seconds for the door 26 to move about 90 degrees, the movement is slow enough to avoid startling a chicken or endangering a chicken unable to quickly move away from the door 26. If the door moved significantly faster, moving 90 degrees in less than 5 seconds for example, a chicken may be injured or startled. The Belimo LM24-3 can be configured to move the door 26 about 90 degrees in about 95 seconds.

Even though the door 26 is moving relatively slow, it may be desirable to limit the force the door 26 could apply to a chicken present in the frame opening 24. For example, if a chicken was injured or sick, and was unable to move away from the frame opening 24, it would be advantageous to limit the force generated by the door when the door 26 moves. The door 26 has a door edge 34 that is adjacent the second frame portion 46 when the door is in the closed position. The motor drive unit 30 is adapted to generate a maximum output torque to limit a door closing force measured between the door edge and the second frame portion to an amount of force less than 22 Newtons (5 pounds-force) when the door is closing. The motor drive unit 30 may make an estimation of the output torque by measuring a motor current.

When an opening signal or closing signal is present, a motor supply voltage is applied to the motor to generate torque and move the motor. When the motor moves, the motor generates a voltage potential know as back electromotive force, or back EMF, that is dependent on motor speed. The polarity of the back EMF opposes the motor supply voltage and so limits the motor current. If a mechanical load is applied to the motor such that the motor slows or stalls, the back EMF will be reduced and the motor current will increase. If the motor current exceeds a threshold, then the motor drive unit may reduce the motor supply voltage or limit the motor current. Reducing the motor supply voltage or limiting the motor current will limit the maximum output torque, and prevent overheating of the motor due to excessive current. Alternately, the motor control unit may measure output torque using a torque sensor, and reduce the motor supply voltage in response to measuring output torque greater than a threshold. The Belimo LM24-3 can be suitably configured to limit torque at the rotation coupler 58 to about 4 Newton-meters (35 inch-pounds).

When the door 26 is in the closed position and a large predator such as a wolf or a mountain lion is attempting to push the door 26 beyond the closed position, i.e.—inward relative to the chicken coop 12, the large predator may have the strength to overcome a maximum inward holding force of the motor drive unit 30. The maximum inward holding force may be increased by providing a door stop 64 arranged to prevent the door from being forced past the closed position. The door stop is preferably attached to the inside surface of frame opening 24, at least to the second frame portion 46, as shown in FIG. 2. Alternately, the door stop 64 may be attached to the frame opening surface of the top frame portion 40 (not shown). Attaching a door stop to the bottom frame portion 42 should be avoided since dirt, straw, feed, feathers, or other materials may be present that may prevent the door 26 from moving completely to the closed position. For this reason, the door stop 64 has a door stop gap 65 between the bottom end of the door stop 64 and the bottom frame portion 42. The door stop gap is suitably about 25 millimeters (1 inch).

The chicken coop door module may also include a door closed switch 78 arranged to be activated when the door 26 is in the closed position. The door closed switch 78 is illustrated in FIG. 2-3 as being part of the top frame portion 40, but could be suitably located elsewhere to detect if the door 26 is in the closed position. An electrical connection to door closed switch 78 is by way of a wire 72. The door closed switch 78 may be electrically coupled to a signaling device such as a light bulb 84 so that the chicken caretaker can see from a distance an indication that the door 26 is closed. Alternately, the door closed switch 78 may be connected to a commercially available motion activated yard light (not shown) in such a way so when the door is closed the motion sensor (not shown) is activated and turns on a light or energizes a klaxon if motion near the chicken coop is detected. Preferably, the door closed switch 78 may be electrically coupled to a controller 70 configured to utilized the signal from door closed switch 78 in a manner described below.

Figure 4:
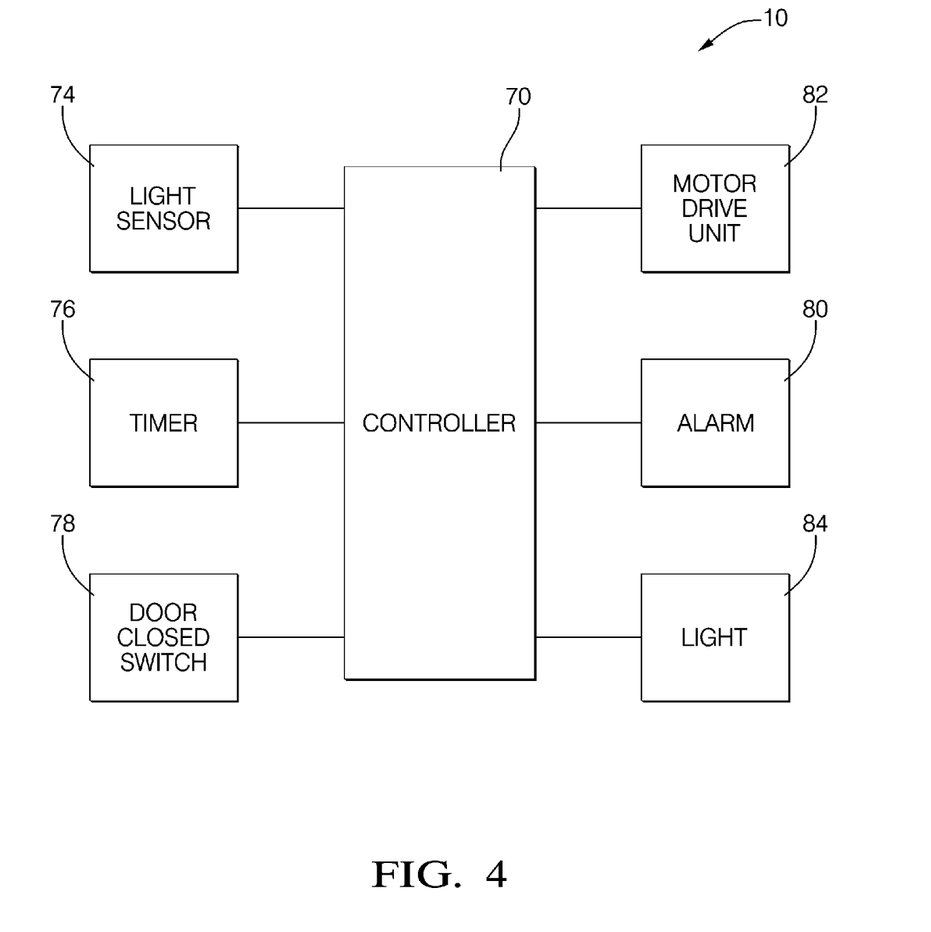
FIG. 4 is a block diagram of the system of FIG. 1.

FIG. 4 is a block diagram of the chicken coop system 10. The controller 70 is adapted to output the opening signal and the closing signal. The controller 70 is electrically connected to the motor drive unit 30 by a wire 72. The controller 70 is configured to output the opening signal and output the closing signal to the motor drive unit 30. The chicken coop system 10 may include a light sensor 74 that is electrically coupled to the controller 70. The light sensor 74 is arranged to be exposed to sunlight so the controller 70 can determine an opening time around sunrise for outputting the opening signal, and determine a closing time around sunset for outputting the closing signal. The light sensor is suitably mounted on the roof 16 of the chicken coop system 10. A controller outputting an opening signal and a closing signal only in response to a signal from the light sensor 74 may only need simple logic type electronics to effectively control the position of door 26.

Preferably, the chicken coop system 10 includes a timer 76 coupled to the controller and configured to output a timer signal for determining an opening time to output the opening signal and closing time to output the closing signal. Such a timer based controller may suitable have a microprocessor and memory so that the opening time and closing time can be programmed into the controller 70. A suitable controller is an Orbit Irrigation sprinkler timer model 57194. The sprinkler timer has a built in clock to serve as the timer 76, and can be configured to output an opening and a closing signal. The opening signal is provided by momentarily activating a first sprinkler zone control signal, and a closing signal is provided by momentarily activating a second sprinkler zone control signal. If the sprinkle timer is coupled to a Belimo LM24-3, then the sprinkler timer can be suitably programmed to output the opening signal and the closing signal for 2 minutes (120 seconds), a time longer than the 95 seconds necessary for the Belimo LM24-3 to move 90 degrees.

The chicken coop system 10 may include both the light sensor 74 and the timer 76 coupled to the controller 70, wherein the opening time and the closing time may be based on the timer signal and the light sensor signal. Having the light sensor 74 coupled to an adequate controller provides for a chicken coop system 10 that automatically adjusts the opening time in accordance with the seasonal time changes of sunrise and sunset. Such an arrangement would also enable the controller to adjust the opening time relative to precede sunrise or sunset. A suitable controller 70 capable of more sophisticated programming is a Building Automation controller from Johnson Controls. For example, it may be desirable to delay opening the door 26 during certain times of the year when the mornings are colder than is healthy for the chickens, and Johnson Controls has inputs for temperature sensors.

The chicken coop system may also have a door closed switch 78 and an alarm 80 coupled to the controller 70. The door closed switch 78 is arranged to be activated when the door is in the closed position. The controller 70 is configured to turn on the alarm 80 to provide an indication that the door 26 is not properly in the closed position a closing period after the controller initiates the closing signal. Such an arrangement will provide a notice to the chicken caretaker that the door 26 may be open and the chickens are at risk of being attacked by a predator. Notice to the caretaker may be by way of the controller 70 by turning on alarm 80 which may include activating a klaxon 82 and/or a light bulb 84. Alternately, alarm 80 may be some other attention getting device located in the caretaker's home. Controller 70 may also be configured to turn on the alarm 80 if the door does not remain in the closed position after being closed such as when a chicken thief tries to pry the door 26 open.

Thus, a chicken coop door module is provided that relieves the chicken caretaker from having to be present to open the chicken coop door each morning and close the chicken coop door each evening. Chickens will instinctively return to roost in the chicken coop as evening approaches, so there is no need for the caretaker to herd the chickens into the coop prior to the door closing. Having a chicken coop equipped with such a door module may allow the caretaker to take a vacation or be away from the chicken coop when it is time to open or close the chicken coop door. For some individuals, having to open and close the chicken coop may be the most unpleasant part of raising chickens. For other individuals, the daily opening and closing of the chicken coop is the reason that they choose to not raise their own chickens or stopped doing so. By being automated, the risk of forgetting to close the door in the evening is reduced and so the chickens are less likely to be subject to predator attack.

Additional, to thwart the efforts of predators, the door module has features such as a motor to hold the door in the closed position, a door stop to reinforce the door module, and an optional alarm. When the door swings into the closed position, the bottom of the frame opening is swept by the door, thereby reducing the risk of the door failing to completely close. The configuration of the plate and rod forming the pivot hinge allow the door and pivot hinge to be readily removed for maintenance such as painting or cleaning the door module While this invention has been described in terms of the preferred embodiments thereof, it is not intended to be so limited, but rather only to the extent set forth in the claims that follow.

I claim:

1. A chicken coop door module comprising:
  a frame configured to define a frame opening and be attached to a chicken coop wall having a wall opening, wherein the frame opening is to be aligned with the wall opening, said frame having a top frame portion, a bottom frame portion, a first side portion, and a second side portion;
  a pivot hinge movably coupled to the frame, said pivot hinge comprising a rod configured to extend vertically between the top frame portion and the bottom frame portion substantially close to the first side portion and define a longitudinal axis, wherein said pivot hinge pivots about the longitudinal axis;
  a door coupled to the frame by the pivot hinge and movable between an open position, where the door is substantially vertical and substantially perpendicular to the frame such that the frame opening is substantially unobstructed, and a closed position, where door is substantially vertical and substantially parallel to the frame such that the frame opening is substantially obstructed by the door; and a motor drive unit coupled to the pivot hinge, said motor drive unit configured to rotate the pivot hinge about the longitudinal axis and thereby move the door toward the open position in response to receiving an opening signal, move the door toward the closed position in response to receiving a closing signal, and prevent the door from moving when no signal is received.

2. The module in accordance with claim 1, wherein the motor drive unit is further configured move the door from the closed position to the open position during an opening time to interval greater than about 15 seconds, and move the door from the open position to the closed position during a closing time interval greater than about 15 seconds.

3. The module in accordance with claim 1, wherein when the door is in the closed position, the door is recessed within the frame opening and spaced apart from the frame opening by a clearance gap less than an amount effective to prevent a predator from getting a grip on the door.

4. The module in accordance with claim 1, wherein said frame opening is a rectangle.

5. The module in accordance with claim 4, wherein the frame defines a rectangle perimeter having a perimeter width of about 368 millimeters (14.5 inches) and a perimeter height greater than about 368 millimeters (14.5 inches).

6. The module in accordance with claim 1, wherein the pivot hinge further comprises a plate arranged tangential and fixedly attached to the rod, whereby the door is coupled to the pivot hinge by plate.

7. The module in accordance with claim 1, wherein the motor drive unit is attached to the top frame portion, the motor drive unit has a motor output coupled to the pivot hinge in a manner effective to rotate the pivot hinge about the longitudinal axis.

8. The module in accordance with claim 7, wherein the motor drive unit has a rotating coupler coupled to the motor output, the rod extends through the rotating coupler, and the rod is fixedly attached to the rotating coupler, whereby the motor output is coupled to the pivot hinge.

9. The module in accordance with claim 1, wherein the door has an edge that is adjacent the second frame portion when the door is in the closed position, and the motor drive unit limits a maximum output torque applied to the pivot hinge such that a door closing force between the door edge and the second frame portion is limited to avoid injury to a chicken located between the door edge and the second frame portion when the door is closing.

10. The module in accordance with claim 1, further comprising a door stop coupled to the frame and configured to prevent the door from being forced past the closed position.

11. The module in accordance with claim 1, further comprising a door closed switch arranged to be activated when the door is in the closed position.

12. The module in accordance with claim 1, further comprising a controller electrically coupled to the motor drive unit and configured to output the opening signal and output the closing signal.

13. The module in accordance with claim 12, further comprising a light sensor electrically coupled to the controller and arranged to be exposed to sunlight to determine an opening time around sunrise for outputting the opening signal, and to determine a closing time around sunset for outputting the closing signal.

14. The module in accordance with claim 12, further comprising a timer coupled to the controller and configured to output a timer signal to determine an opening time for outputting the opening signal and to determine a closing time for outputting the closing signal.

15. The module in accordance with claim 14, further comprising a light sensor electrically coupled to the controller, wherein the opening time and the closing time are determined based on the timer and the light sensor.

16. The module in accordance with claim 12, further comprising:
a door closed switch coupled to the controller and arranged to be activated when the door is in the closed position; and
an alarm coupled to the controller and effective to provide an indication that the alarm is activated,
wherein the controller is further configured to output the closing signal at a closing time, and activate the alarm if the door closed switch is not activated a closing period after the closing time.

17. The module in accordance with claim 1, further comprising:
a bottom hole in the bottom frame portion surrounding the longitudinal axis and configured to receive the pivot hinge; and
a top hole in the top frame portion surrounding the longitudinal axis, wherein the top hole is configured to receive the pivot hinge and allow the pivot hinge to be removed from the frame module by lifting the pivot out of the bottom hole, then angling the pivot hinge such that the bottom of the pivot hinge is outside of the frame opening, and then withdrawing the pivot hinge out of the top hole.

18. A chicken coop system comprising:
a chicken coop having a wall with a wall opening;
a frame attached to the wall and configured to define a frame opening, wherein the frame opening is aligned with the wall opening, said frame having a top frame portion, a bottom frame portion, a first side portion, and a second side portion;
a pivot hinge movably coupled to the frame, said pivot hinge comprising a rod configured to extend vertically between the top frame portion and the bottom frame portion substantially close to the first side portion and define a longitudinal axis, wherein said pivot hinge pivots about the longitudinal axis;
a door coupled to the frame by the pivot hinge and movable between an open position, where the door is substantially vertical and substantially perpendicular to the frame such that the frame opening is substantially unobstructed, and a closed position, where door is substantially vertical and substantially parallel to the frame such that the frame opening is substantially obstructed by the door; and
a motor drive unit coupled to the pivot hinge, said motor drive unit configured to rotate the pivot hinge about the longitudinal axis and thereby move the door toward the open position in response to receiving an opening signal, move the door toward the closed position in response to receiving a closing signal, and prevent the door from moving when no signal is received.

19. The system in accordance with claim 18, wherein the motor drive unit is further configured move the door from the closed position to the open position during an opening time to interval greater than about 15 seconds, and move the door from the open position to the closed position during a closing time interval greater than about 15 seconds.

20. A chicken coop door module comprising:
a frame configured to define a frame opening and be attached to a chicken coop wall having a wall opening, wherein the frame opening is to be aligned with the wall opening, said frame having a top frame portion, a bottom frame portion, a first side portion, and a second side portion;

a pivot hinge movably coupled to the frame, said pivot hinge comprising a rod configured to extend vertically between the top frame portion and the bottom frame portion substantially close to the first side portion and define a longitudinal axis, wherein said pivot hinge pivots about the longitudinal axis;

a door coupled to the frame by the pivot hinge and movable between an open position, where the door is substantially vertical and substantially perpendicular to the frame such that the frame opening is substantially unobstructed, and a closed position, where door is substantially vertical and substantially parallel to the frame such that the frame opening is substantially obstructed by the door; and a motor drive unit coupled to the pivot hinge, said motor drive unit configured to rotate the pivot hinge about the longitudinal axis and thereby move the door toward the open position in response to receiving an opening signal and during an opening time to interval greater than about 15 seconds, move the door toward the closed position in response to receiving a closing signal and during a closing time interval greater than about 15 seconds, and prevent the pilot hinge from rotating when no signal is received and thereby prevent the door from moving when no signal is received;

a controller electrically connected to the motor drive unit and configured to output the opening signal at an opening time and output the closing signal at a closing time; and a timer coupled to the controller and configured to output a timer signal to determining the opening time for outputting the opening signal and determine the closing time for outputting the closing signal.

* * * * *